Jan. 5, 1932.                    W. E. PALMER                    1,840,126
                              TREE DIGGER BLADE
                              Filed Oct. 8, 1930
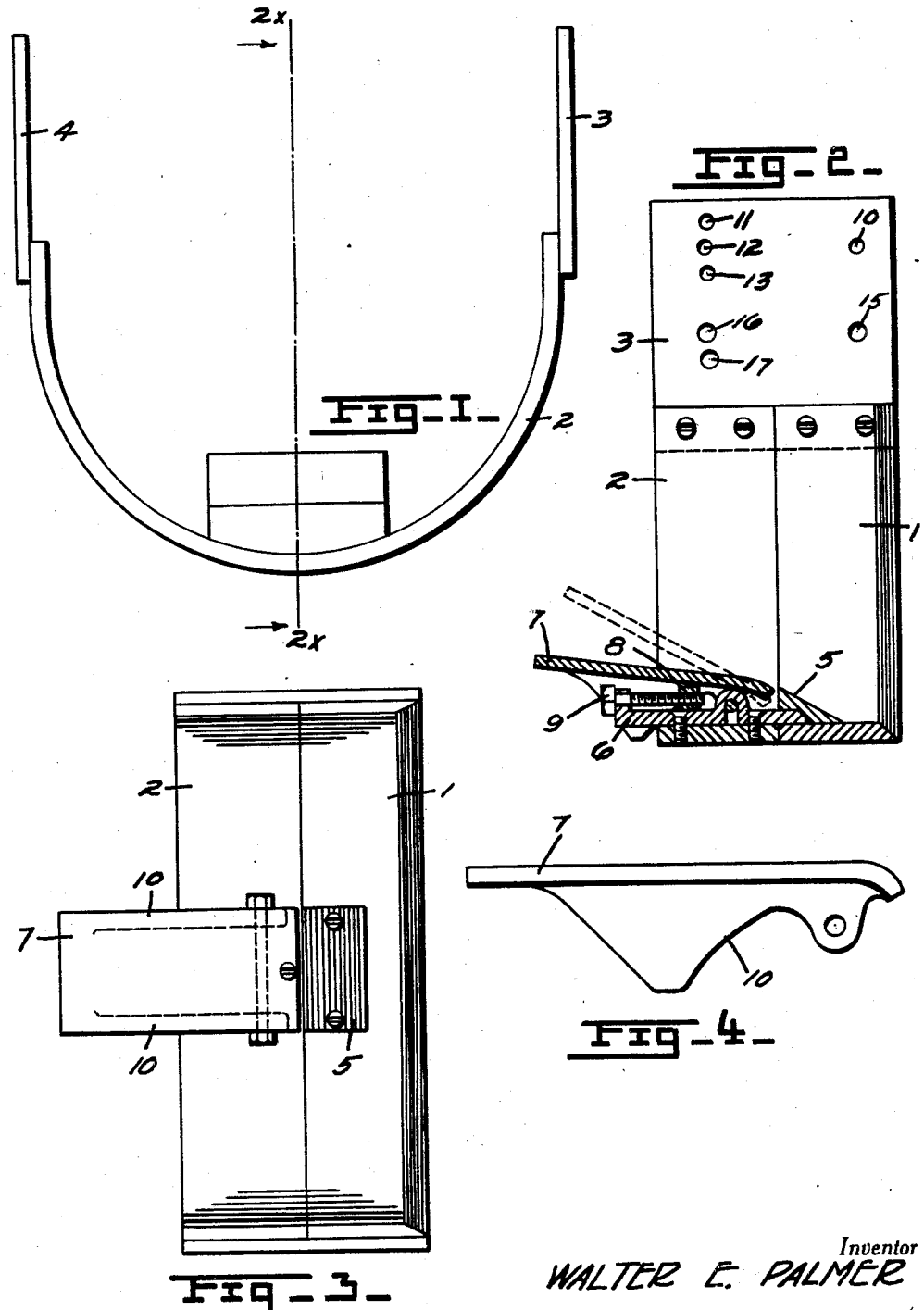
Inventor
WALTER E. PALMER
By Frank Kiefer
Attorney Patented Jan. 5, 1932

1,840,126

UNITED STATES PATENT OFFICE

WALTER E. PALMER, OF DANSVILLE, NEW YORK

TREE-DIGGER BLADE

Application filed October 8, 1930. Serial No. 487,274.

The object of this invention is to provide a new and improved form of treedigger blade.

Another object of the invention is to make the blade so that the parts that wear out quickly can be replaced cheaply and easily. This and other objects of the invention will be illustrated in the drawings described in the specification and pointed out in the claims at the end thereof.

In the drawings:

Figure 1 is a rear elevation of the blade.

Figure 2 is a vertical section on the line 2x, 2x, of Figure 1.

Figure 3 is a top plan view of the blade.

Figure 4 is a detailed view of the lifting paddle.

In the drawings like reference numerals indicate like parts.

In the drawings reference numeral 1 indicates the semicircular cutting blade or plate and reference numeral 2 indicates the backing or re-inforcing plate. 3 and 4 indicate the side plates of the knife, by which the cutting plate and reinforcing plate are joined together.

In the bottom of the cutting plate is rigidly fastened the lifting blade 5, which is beveled and tapers to an edge at the front. On the plates 1 and 2 are mounted the hinge block 6, shown in Figure 2. On the block is pivotally mounted the paddle 7, shown in Figures 2, 3, and 4.

On the hinge block 6 is mounted to slide the adjusting block 8. This block is moved back and forth by the stud 9, which stud is swiveled on the hinge block 6 and makes threaded engagement with the adjusting block 8. The paddle 7 is provided with cam surfaces 10, with which the adjusting block 8 engages, and as the block 8 is moved to the left in Figure 2, the paddle 7 is moved up from the full line position to the dotted line position, and as it is moved to the right it is moved down from the dotted line position to the full line position. The higher up the rear end of the paddle is raised, that is, the more inclination that is given to it, the more will the roots of the trees be lifted up as the digger is pulled along by the horses.

In Figure 2 I have shown certain holes 10, 11, 12 and 13 at the top of the side plates 3 and 4 which are adapted to receive bolts by which the handles are fastened to the digger and below these holes are shown certain other holes, 15, 16 and 17 that are adapted to receive bolts by which the draft beams are adapted to be fastened to the digger. It will also be understood that the handles extend rearwardly from the digger and the draft beams extend forwardly from the digger and are fastened to the digger in substantially the same manner as is shown in the patent of Bragg 275,575.

I claim:

1. In a tree digger the combination of a semicircular cutting blade, a semicircular reinforcing plate, placed end to end therewith on the same axis, side plates connected to the upper edges of both the cutting blade and the reinforcing plate, said side plates joining them together and holding them in line with each other, a lifting blade fastened to the cutting blade and adapted to lift the roots cut by the cutting blade on the forward movement of the digger, a hinge block fastened to the cutting blade and the reinforcing plate behind the lifting blade, a paddle having its forward end pivotally mounted thereon, and means for raising or lowering the rear end of the paddle.

2. In a tree digger the combination of a semicircular cutting blade, a semicircular reinforcing plate, placed end to end therewith on the same axis, side plates connected to the upper edges of both the cutting blade and the reinforcing plate, said side plates joining them together and holding them in line with each other, a lifting blade fastened to the cutting blade and adapted to lift the roots cut by the cutting blade on the forward movement of the digger, a hinge block fastened to the cutting blade and reinforcing plate behind the lifting blade, a paddle having its forward end pivotally mounted thereon, an adjusting block mounted to slide on the hinge block, cam surfaces on the paddle with which the adjusting block engages, and a stud swiveled in the hinge block and adapted to make threaded engagement with the adjusting block to move it back and forth in engagement with the cam surfaces on the paddle, whereby the paddle is raised or lowered.

In testimony whereof I affix my signature.

WALTER E. PALMER.